US009946698B2

(12) United States Patent
Guarnieri et al.

(10) Patent No.: US 9,946,698 B2
(45) Date of Patent: Apr. 17, 2018

(54) INSERTING TEXT AND GRAPHICS USING HAND MARKUP

(71) Applicant: Konica Minolta Laboratory U.S.A., Inc., San Mateo, CA (US)

(72) Inventors: Stuart Guarnieri, Laramie, WY (US); William John Briggs, Broomfield, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 15/087,596

(22) Filed: Mar. 31, 2016

(65) Prior Publication Data

US 2017/0286378 A1  Oct. 5, 2017

(51) Int. Cl.
| | |
|---|---|
| G06F 17/20 | (2006.01) |
| G06F 17/24 | (2006.01) |
| G06F 17/21 | (2006.01) |
| G06F 17/22 | (2006.01) |
| G06K 9/00 | (2006.01) |

(52) U.S. Cl.
CPC ............ *G06F 17/24* (2013.01); *G06F 17/212* (2013.01); *G06F 17/218* (2013.01); *G06F 17/2288* (2013.01); *G06K 9/00442* (2013.01); *G06K 2209/01* (2013.01)

(58) Field of Classification Search
CPC .................................................. G06F 3/04883
See application file for complete search history.

(56) References Cited

U.S. PATENT DOCUMENTS

| | | | | |
|---|---|---|---|---|
| 2003/0123733 A1* | 7/2003 | Keskar | .................... | G06F 3/002 382/187 |
| 2005/0025348 A1* | 2/2005 | Tecu | .................... | G06K 9/2054 382/128 |
| 2006/0018546 A1* | 1/2006 | Lagardere | ........... | G06F 3/04883 382/186 |
| 2007/0052685 A1* | 3/2007 | Wakai | ................. | G06F 3/04883 345/173 |
| 2007/0258113 A1* | 11/2007 | Vau | ....................... | H04N 1/3871 358/452 |
| 2011/0141067 A1* | 6/2011 | Misawa | ................ | G06F 3/0304 345/179 |
| 2012/0026081 A1* | 2/2012 | Kompalli | .................. | G06F 8/34 345/156 |
| 2012/0189202 A1* | 7/2012 | Kan | ...................... | G06F 17/241 382/176 |
| 2014/0337132 A1 | 11/2014 | Kilroy et al. | | |

* cited by examiner

*Primary Examiner* — Keith D Bloomquist
(74) *Attorney, Agent, or Firm* — Osha Liang LLP (57) ABSTRACT

A method may include obtaining an image that includes a first graphics element and a second graphics element, determining that the first graphics element corresponds to a command and that the second graphics element is a non-command, and generating an electronic document by executing the command. The electronic document may include a revised version of the second graphics element, but not the first graphics element. The electronic document may be generated in response to the first graphics element corresponding to the command.

20 Claims, 8 Drawing Sheets

INSERTING TEXT AND GRAPHICS USING HAND MARKUP

BACKGROUND

Writing boards (e.g., whiteboards, blackboards, etc.) are used in many different settings (e.g., academic, corporate, non-profit, residential, etc.). Text, drawings, charts, graphs, etc. may be placed on writing boards to communicate ideas during lectures, training, brainstorming sessions, etc. In order to electronically memorialize these ideas, a photograph or printout of the writing board may be taken and image processing may be executed to generate an electronic document based on the photograph or printout.

However, the author of the writing board content is unable to control the formatting or document settings of the generated electronic document. In other words, the author of the writing board content must manually modify the electronic document after it is generated to obtain the desired look and feel. The author also must manually modify the electronic document after it is generated to insert additional content. Regardless, users are still interested in generating electronic documents based on the contents of a writing board.

SUMMARY

In general, in one aspect, the invention relates to a method for image processing. The method comprises: obtaining an image that includes a first graphics element and a second graphics element, determining that the first graphics element corresponds to a command and that the second graphics element is a non-command, and generating an electronic document by executing the command. The electronic document includes a revised version of the second graphics element, but not the first graphics element. The electronic document is generated in response to the first graphics element corresponding to the command.

In general, in one aspect, the invention relates to a system for image processing. The system comprises: a buffer storing an image that includes a first graphics element and a second graphics element, a command engine that determines that the first graphics element corresponds to a command and that the second graphics element is a non-command, and a document synthesizer that generates an electronic document by executing the command. The electronic document includes a revised version of the second graphics element, but not the first graphics element.

In general, in one aspect, the invention relates to a non-transitory computer readable medium storing instructions for image processing. The instructions comprising functionality to: obtain an image that includes a first graphics element and a second graphics element, determine that the first graphics element corresponds to a command and that the second graphics element is a non-command, and generate an electronic document by executing the command. The electronic document includes a revised version of the second graphics element, but not the first graphics element. The electronic document is generated in response to the first graphics element corresponding to the command.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method, a non-transitory computer readable medium, and a system for image processing. The image processing includes generating an electronic document based on an image having graphics elements (e.g., hand-drawn text characters, hand-drawn symbols, etc.). The image may be of a writing board (e.g., whiteboard, blackboard, etc.) on which the graphical elements have been hand-drawn. The generated electronic document may include some of the graphics elements found within the image. Other graphics elements in the image may correspond to commands to be executed against the electronic document, but do not actually appear (i.e., are not visible) in the electronic document. These commands control the look and feel of the electronic document. For example, executing one command may insert a stored image (e.g., a company's logo) or a stored string (e.g., legal disclaimer) into the electronic document. As another example, executing one command may calculate values (e.g., pages numbers) for insertion into the electronic document. Commands may also identify configuration files containing document settings and/or customized content for insertion into the electronic document.

Figure 1:
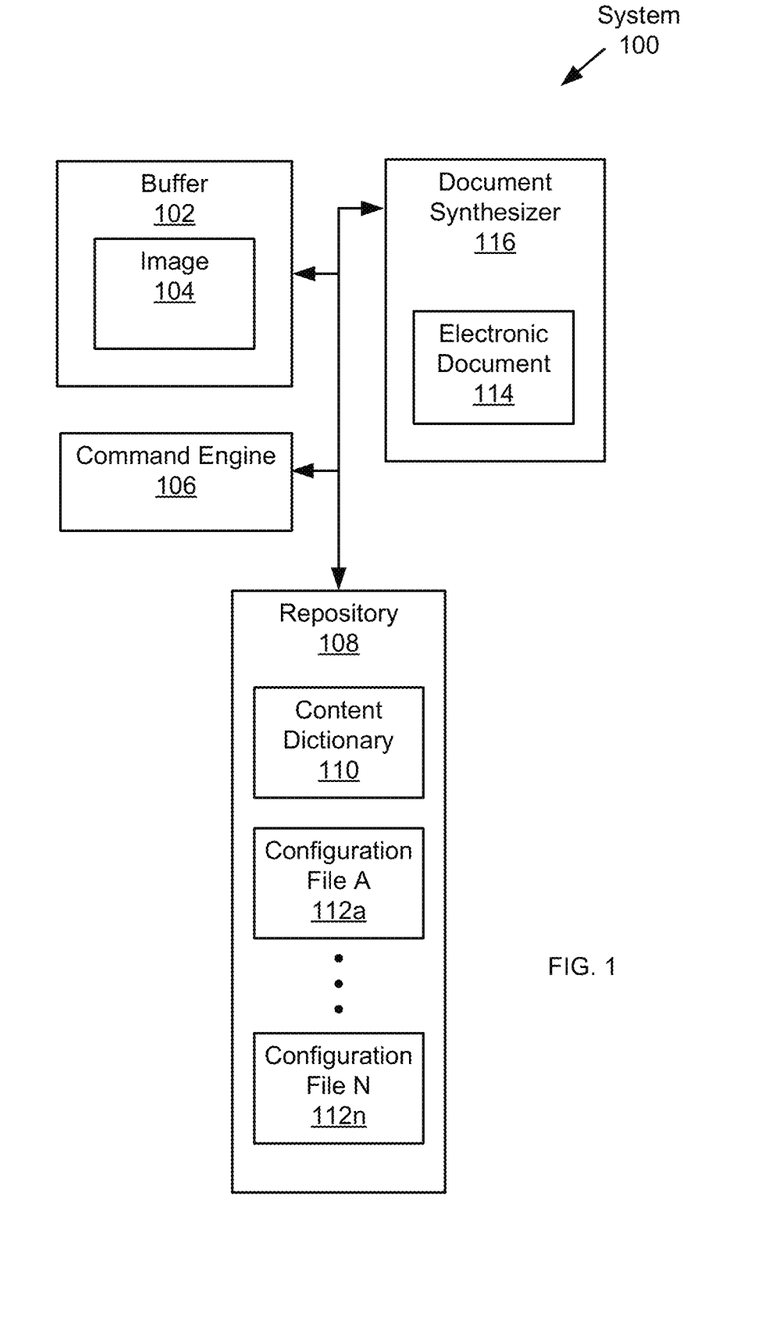
FIG. 1 shows a system in accordance with one or more embodiments of the invention.

FIG. 1 shows a system (100) in accordance with one or more embodiments of the invention. As shown in FIG. 1, the system (100) has multiple components including a buffer (102), a command engine (106), a repository (108), and a document synthesizer (116). Each of these components (104, 108, 110, 116) may be located on the same computing device (e.g., personal computer (PC), laptop, tablet PC, smart phone, server, mainframe, cable box, kiosk, etc.) or may be located on different computing devices connected by a network of any size and any topology having wired and/or wireless segments.

In one or more embodiments of the invention, the system (100) includes the buffer (102). The buffer (102) may be implemented in hardware (i.e., circuitry), software, or any combination thereof. The buffer (102) stores an image (104). The image (104) may be a scan of a hardcopy document. The image (104) may also be a digital photograph. The image (104) may be obtained from a scanner, obtained from a digital camera, retrieved from storage, downloaded from a website, etc. Further, the image (104) may be of any size and in any format (e.g., JPEG, GIF, BMP, etc.).

In one or more embodiments of the invention, the image (104) includes graphics elements. These graphics elements may correspond to hand-drawn text characters, hand-drawn symbols, etc. For example, if the image (104) is a scan of a sheet of paper, each graphics element may be a string of text characters that have been hand-drawn on the sheet of paper using a pen. As another example, if the image (104) is a photograph of a whiteboard, each graphics element may be a string of text characters that have been hand-drawn on the whiteboard using a marker. Some graphics elements correspond to commands, where the command may be identified by a command-invoking character(s) (e.g., #, [[, ^, &&, %$, etc.). In one or more embodiments of the invention, a graphics element may correspond to a command to insert the following types of data into an electronic document (114): a stored image (e.g., a logo or picture), a calculated value (e.g., a page number, total number of pages, or a calendar date), and/or a text string (e.g., a legal disclaimer such as a confidentiality, copyright or trademark notice, or a signature block). In one or more embodiments of the invention, a graphics element may represent a command to modify a setting of the electronic document (114), such as a font, margin, page size, background color, and/or style. In one or more embodiments of the invention, a graphics element may represent a command that identifies a configuration file (112a-112n) that may be used to customize the look and feel of the electronic document (114).

In one or more embodiments of the invention, the system (100) includes the command engine (106). The command engine (106) may be implemented in hardware (i.e., circuitry), software, or any combination thereof. The command engine (106) may include functionality to determine whether a graphics element in the image (104) corresponds to a command. For example, the command engine (106) may execute intelligent character recognition (ICR) on the image (104) to extract characters from a graphics element, and then parse the extracted characters in search of a command-invoking character. If a command-invoking character is found (e.g., #), the graphics element is deemed to correspond to a command. A subset of the extracted characters (e.g., the remaining characters following the command-invoking character) may specify or map to the command. Any graphics element that does not correspond to a command (i.e., the characters extracted from the graphics element do not include the command-invoking character) may be referred to as a non-command.

In one or more embodiments, the repository (108) may be any type of storage unit and/or device (e.g., a file system, database, collection of tables, or any other storage mechanism) for storing data. Further, the repository (108) may include multiple different storage units and/or devices. The multiple different storage units and/or devices might or might not be of the same type or located at the same physical site. In one or more embodiments, the repository (108) stores a content dictionary (110). The content dictionary (110) may include standard contents (e.g., standardized icons, general legal disclaimers, etc.) that are commonly used by multiple users and/or organizations. The standard contents may have been generated prior to the creation of the image (104). Moreover, the standard contents may be generated by anyone or any organization. One or more items in the content dictionary (110) may be added to the electronic document (114) if the image (104) includes a graphics element corresponding to an insertion command for the item(s).

In one or more embodiments of the invention, the repository (108) stores one or more configuration files (112a-112n). The configuration files (112a-112n) may include non-standard, customized user-specific or organization-specific contents (e.g., product pictures, company logos, specific legal disclaimers, etc.). In one or more embodiments of the invention, configuration files (112a-112n) may also include customized settings of the electronic document (114), such as a font, margin, page size, background color and/or style. Each configuration file (112a-112n) may have been generated prior to the creation of the image (104). Moreover, each configuration file (112a-112n) may be generated by anyone or any organization. All the content and settings in a configuration file (112a-112n) may be inserted/applied to the electronic document (114) if the image (104) includes a graphics elements corresponding to the command identifying the configuration file (112a-112n).

In one or more embodiments of the invention, both the content dictionary (110) and configuration files (112a-112n) are collections of information configured for ease of data retrieval, modification, re-organization, and deletion. In one or more embodiments, the content dictionary (110) and configuration files (112a-112n) may be accessed via a Database Management System (DBMS), which is a software application that provides an interface for users to define, create, query, update, or administer databases. The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

In one or more embodiments of the invention, the system (100) includes the document synthesizer (116). The document synthesizer (116) may be implemented in hardware (i.e., circuitry), software, or any combination thereof. The document synthesizer (116) may include functionality to generate an electronic document (114) based on the image (104). The electronic document (114) may include revised versions of the graphics elements from the image (104) that are non-commands. These revised versions may be the graphics elements after optical character recognition (OCR) or ICR has been applied. In other words, a revised version of a graphics element may be the string of text characters that is extracted by performing OCR or ICR on the hand-drawn graphics element. In one or more embodiments of the invention, the document synthesizer (116) includes functionality to generate the electronic document (114) by executing the commands determined from the image (104). As discussed above, executing the commands may include, for example, inserting content into the electronic document (114) and/or changing the settings (e.g., font size) of the electronic document (114). The format and contents of the electronic document (114) may be specified using a markup language (e.g., Office Open XML) or any other suitable format (e.g., scalable vector graphics (SVG)). The electronic document (114) may also include additional information such as images, graphics, headers, footers, disclaimers, and/or text stored in named files.

While FIG. 1 shows a configuration of components, other configurations may be used without departing from the scope of the invention. For example, various components may be combined to create a single component. As another example, the functionality performed by a single component may be performed by two or more components. Although FIG. 1 shows the system (100) as having four components (102, 106, 108, 116), in other embodiments, the system (100) may have more or fewer components. For example, the system (100) may include a scanner or a smart phone with a digital camera to capture the image (104).

Figure 2:
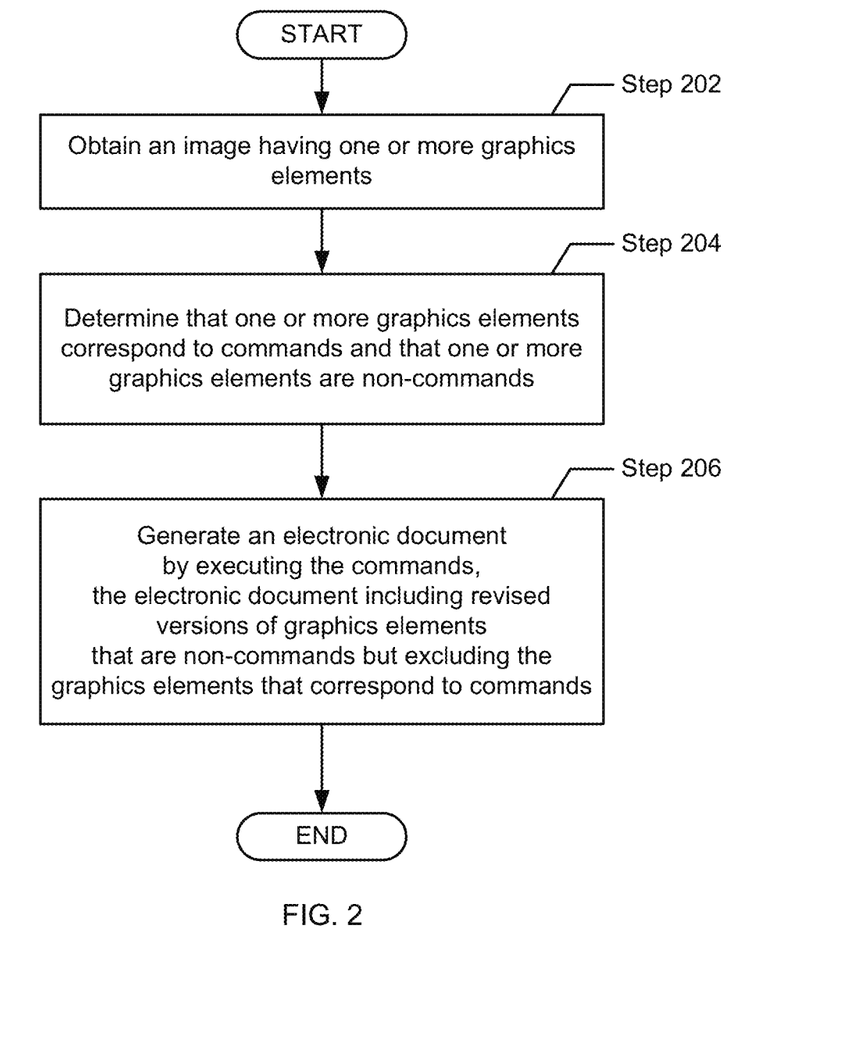
FIG. 2 and FIG. 3 show flowcharts in accordance with one or more embodiments of the invention.

FIG. 2 shows a flowchart in accordance with one or more embodiments of the invention. The flowchart depicts a process for image processing. One or more of the steps in FIG. 2 may be performed by the components (102, 106, 108, 116) of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 202, an image is obtained. The image may be obtained from any source (e.g., a digital camera, a scanner, a website, etc.). The image may include one or more graphics elements. Each graphics element may be a string of hand-drawn characters or a hand-drawn symbol. For example, the image may be a photograph of a whiteboard and one graphics element may be text that has been drawn on the whiteboard using a marker.

In Step 204, it is determined that one or more graphics elements in the image correspond to commands. This may be determined by performing ICR on the image, extracting the text characters of the graphics element, and then parsing the text characters in search of a command-invoking character(s) (e.g., #). The actual command may be identified from the characters following the command-invoking character. Any graphics element that does not correspond to a command (i.e., the extracted text for the graphics element does not include a command-invoking character) is deemed to be a non-command.

In Step 206, an electronic document is generated based on the image. The electronic document may include revised versions of all graphics elements from the image that are deemed to be non-commands. As discussed above, a revised version of a graphics element may be the string of characters extracted from the graphics element by way of ICR. In one or more embodiments of the invention, the electronic document excludes (i.e., does not have) the graphics elements from the image that correspond to commands. In other words, although the graphics elements that correspond to commands are present in the image, these graphics elements are not present in the electronic document.

The electronic document may be generated by executing one or more of the commands corresponding to the graphics elements. Example commands include adding images (e.g., company logos), strings (e.g., legal disclaimers regarding confidentiality), or calculated values (e.g., dates, page numbers, etc.) to the electronic document. Example commands may also include applying an entire configuration file to the electronic document.

In one or more embodiments, the content that is inserted into the electronic document is placed based on the geometric position of the graphics elements in the image. In other words, the content inserted into the electronic document occupies the location that the graphics element (e.g., a graphics element corresponding to a command) would have occupied if the graphics element was included in the electronic document. Additionally or alternatively, the position of the inserted content may be dictated by the command itself (e.g., center, header, footer, etc.).

Figure 3:
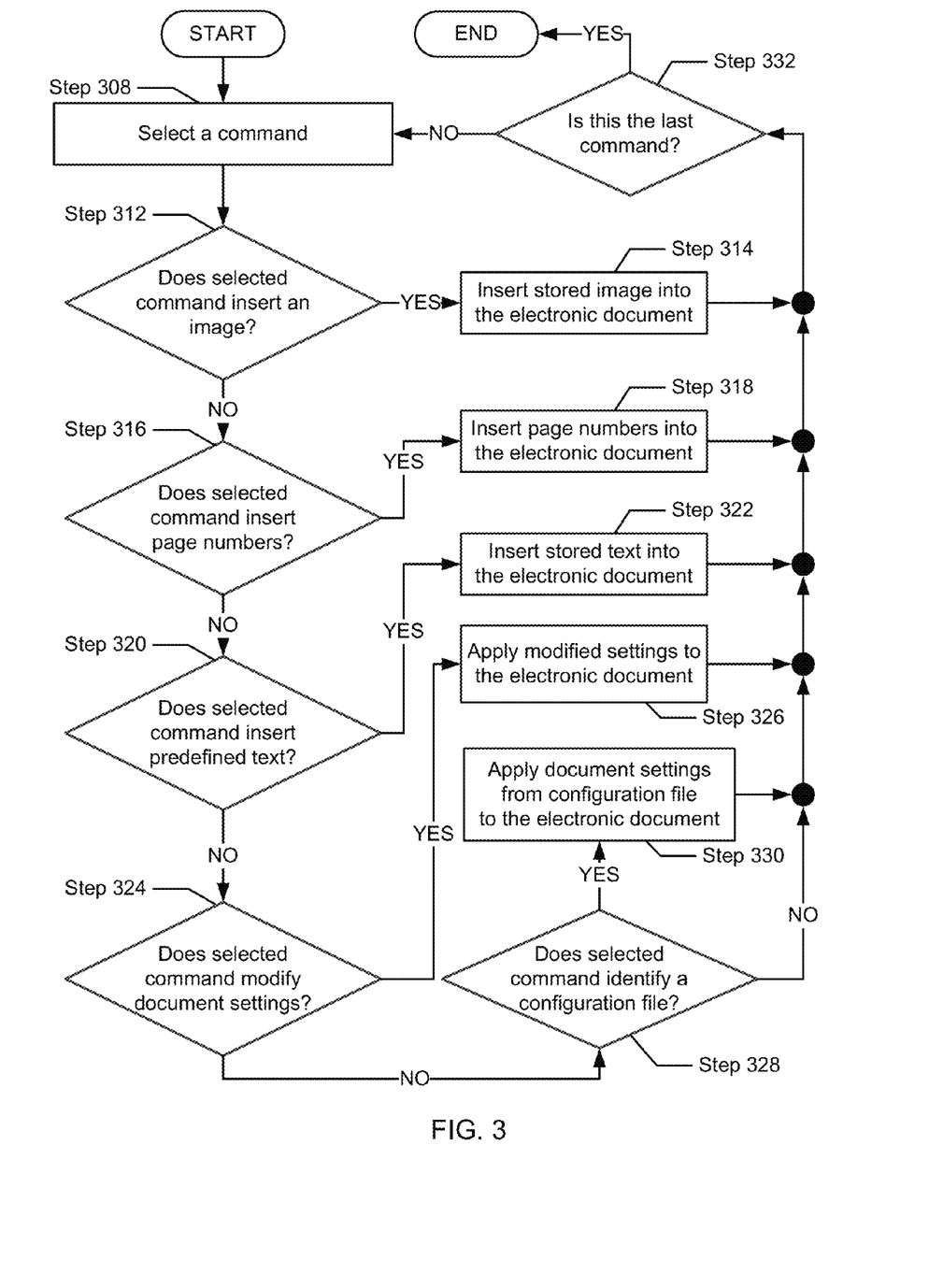

FIG. 3 shows a flowchart in accordance with one or more embodiments of the invention. The flowchart depicts a process for image processing. Moreover, the flowchart in FIG. 3 may correspond to Step 206 in FIG. 2. One or more of the steps in FIG. 3 may be performed by the components (102, 106, 108, 116) of the system (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, a command determined from a graphics element in the image is selected (Step 308).

In Step 312, it is determined whether the command corresponds to inserting an image (e.g., a product picture, corporate logo, or icon) into the electronic document. If so, then in Step 314 the command is executed and the image specified in the command is retrieved from a content dictionary and inserted into the electronic document.

In Step 316, it is determined whether the command corresponds to inserting page numbers into the electronic document. If so, then in Step 318 the command is executed to calculate and insert page numbers for each page of the electronic document.

In Step 320, it is determined whether the command corresponds to inserting a pre-existing text string (e.g., a legal disclaimer) into the electronic document (see Step 206 above). If so, then in Step 322 the command is executed and the text string specified in the command is retrieved from a content dictionary and inserted into the electronic document.

Step 324, it is determined whether the command modifies a font, margin, page size, background color and/or style of the electronic document. If so, then in Step 326, the command is executed and the font, margin, page size, etc. is modified based on what is specified in the command.

In Step 328, it is determined whether the command identifies a configuration file. If so, then in Step 330 the command is executed and the contents and document settings in the configuration file are applied to the electronic document. Document settings may include fonts, margins, page size, background, style, and/or layout). The configuration file may reflect user-specific or organization-specific preferences pertaining to document look and feel). In one or more embodiments, a stored image specified in the configuration file may be inserted into the electronic document.

In Step 332, it is determined whether the selected command is the last command in the image. When there are other commands to execute, the process returns to step 308.

Figure 4A:
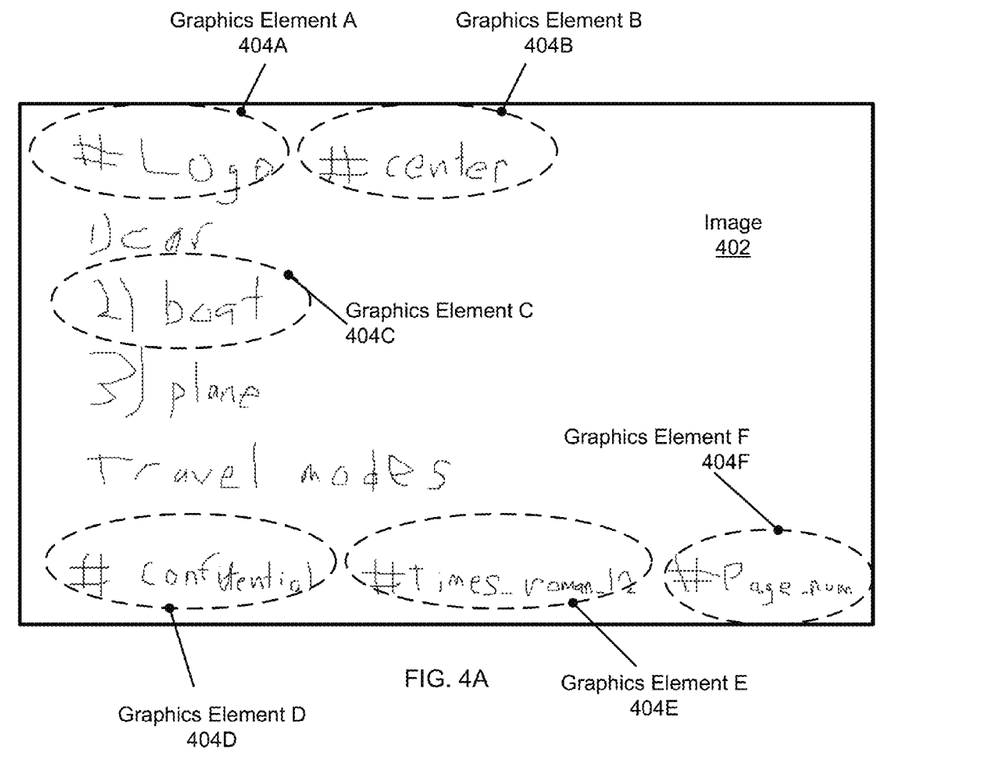
FIGS. 4A-4D show an implementation example in accordance with one or more embodiments of the invention.

FIGS. 4A-4D show an implementation example in accordance with one or more embodiments of the invention. FIG. 4A shows an image (402) that includes multiple graphics elements (i.e., Graphics Element A (404A), Graphics Element B (404B), Graphics Element C (404C), Graphics Element D (404D), Graphics Element E (404E), and Graphics Element F (404F)). As shown in FIG. 4A, these graphics elements (404A, 404B, 404C, 404D, 404E, 404F) are hand-drawn text strings. Some of the graphics elements (404A, 404B, 404D, 404E, 404F) include the command-invoking character #. However, graphics element C (404C) does not have the command-invoking character #.

Although a command-invoking character (e.g., #) is used in the aforementioned exemplary embodiment, the invention is not limited to this particular example. For instance, a specific color (e.g., green) may be used for the command-invoking purpose.

Figure 4B:
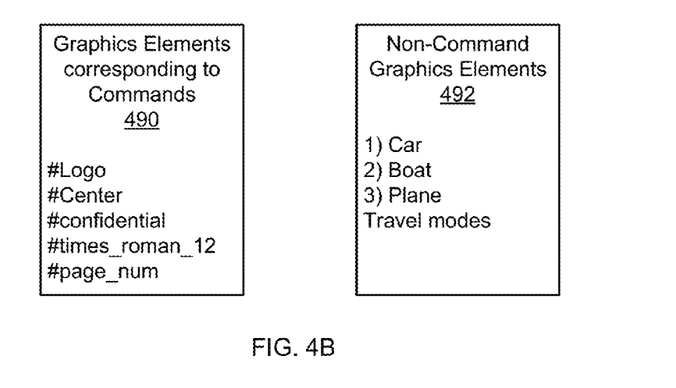

In FIG. 4B, it is determined which graphics elements in the image (402) correspond to commands and which graphics elements in the image (402) are not commands. Specifically, FIG. 4B shows a list of graphics elements that corresponding to commands (490) and a list of graphics elements that are non-commands (492). Both lists (490, 492) have been generated by performing ICR on the image (402) to extract text characters for each graphics element (404A-404F) and then parsing the text characters for the command-invoking character #. #Logo is a command to insert a stored logo into the electronic document. #Center is a command to center the logo in the electronic document. #Confidential is a command to insert the stored confidentiality disclaimer into the electronic document. #Times_roman_12 is a command to set the font of the electronic document to Times New Roman 12 pts. #Page_num is a command to calculate and insert page numbers for each page in the electronic document.

Figure 4C:
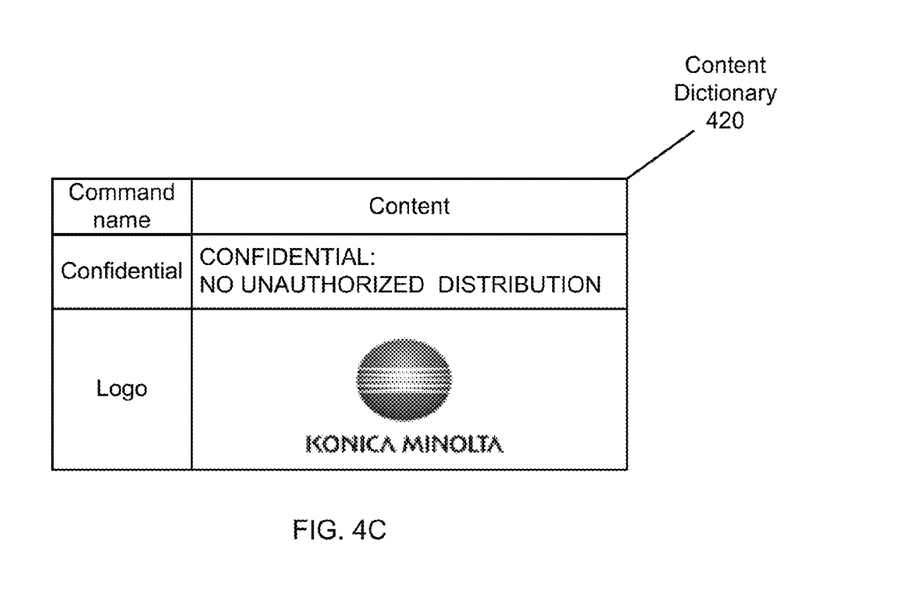

FIG. 4C shows a content dictionary (420) storing a confidentiality disclaimer and a logo. The content dictionary (420) may be generated by anyone before the image (402) is created. As discussed above, the #logo command inserts the logo stored here in the content dictionary (420) into the electronic document. As also discussed above, the #confidential command inserts the confidentially disclaimer stored in the content dictionary (420) into the electronic document.

Figure 4D:
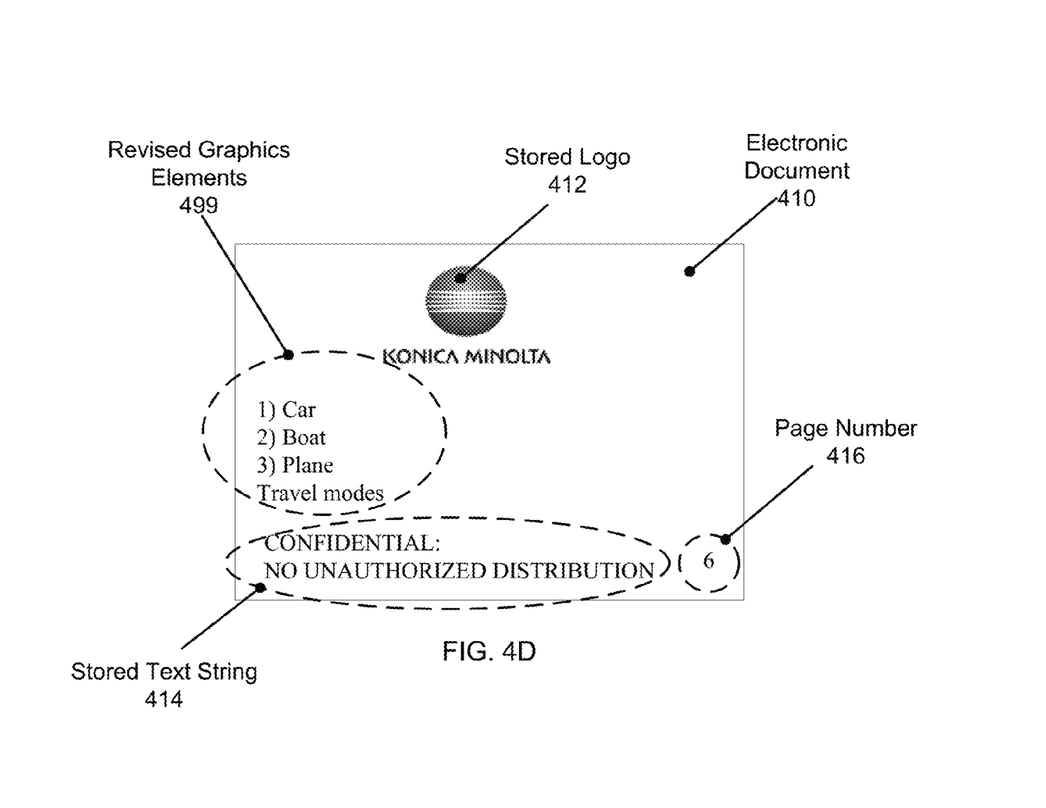

FIG. 4D shows an electronic document (410) that is generated based on the image (402). As shown in FIG. 4D, the electronic document (410) includes revised versions of the non-command graphics elements (499). The revised versions are the text characters extracted by performing ICR on the graphics elements in the image. As also shown in FIG. 4C, executing the #Logo command results in inserting a stored logo (412) into the electronic document (410). Executing the #Center command results in centering the stored logo (412) in the electronic document (410). Executing the #Confidential command results in inserting a stored text string (414) in the electronic document (410). Executing the #Times_roman_12 command results in applying the corresponding font to the electronic document (410). Executing the #Page_num command results in inserting a page number (416) in the electronic document (410). However, the electronic document (410) does not have the graphics elements that correspond to commands (404A, 404B, 404D, 404E, 404F). For example, the text "#times_roman_12" is not in the electronic document (410).

Figure 5A:
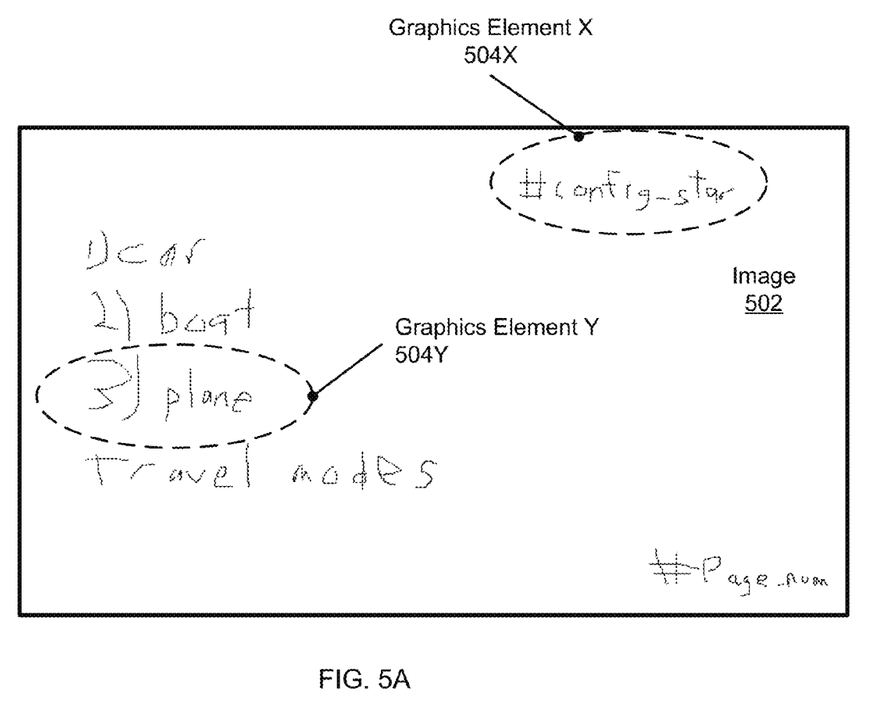
FIGS. 5A-5D show an implementation example in accordance with one or more embodiments of the invention.

FIGS. 5A-5D show an implementation example in accordance with one or more embodiments of the invention. FIG. 5A shows an image (502) having multiple graphics elements (e.g., Graphics Element X (504X), Graphics Element Y (504Y)). As shown in FIG. 5A, these graphics elements (504X, 504Y) are hand-drawn text strings. Graphics element X (504X) includes the command-invoking character #. However, graphics element Y (504Y) does not have the command-invoking character #.

Figure 5B:
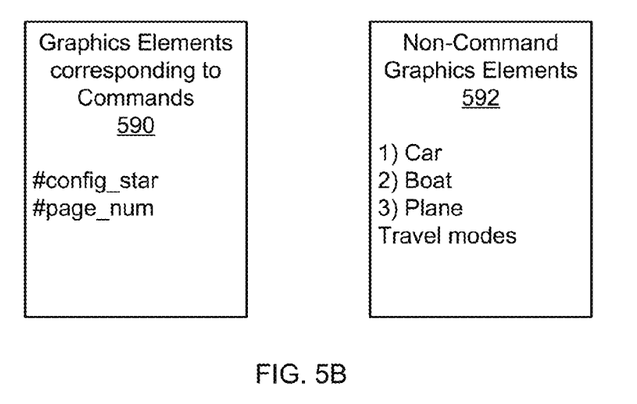

In FIG. 5B, it is determined which graphics elements in the image (502) correspond to commands and which graphics elements in the image (502) are not commands. Specifically, FIG. 5B shows a list of graphics elements corresponding to commands (590) and a list of graphics elements that are non-commands (592). Both lists (590, 592) have been generated by performing ICR on the image (502) to extract text characters for each graphics element (504X, 504Y) and then parsing the text characters for the command-invoking character #. #Config_star is a command to apply the star configuration file to the electronic document. #Page_num is a command to calculate and insert page numbers for each page in the electronic document.

Figure 5C:
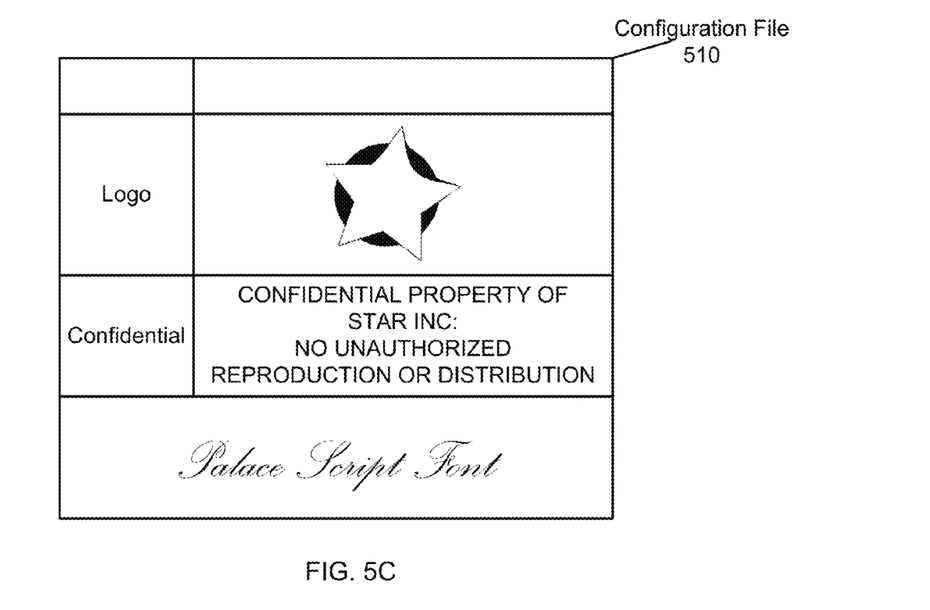

FIG. 5C, shows the star configuration file (510). As shown in FIG. 5C, the star configuration file includes a logo to be inserted into the electronic document, a confidentiality statement to be inserted into the electronic document, and a font to be applied to some or all of the electronic document. The star configuration file (510) may be generated by anyone before the image (502) is created.

Figure 5D:
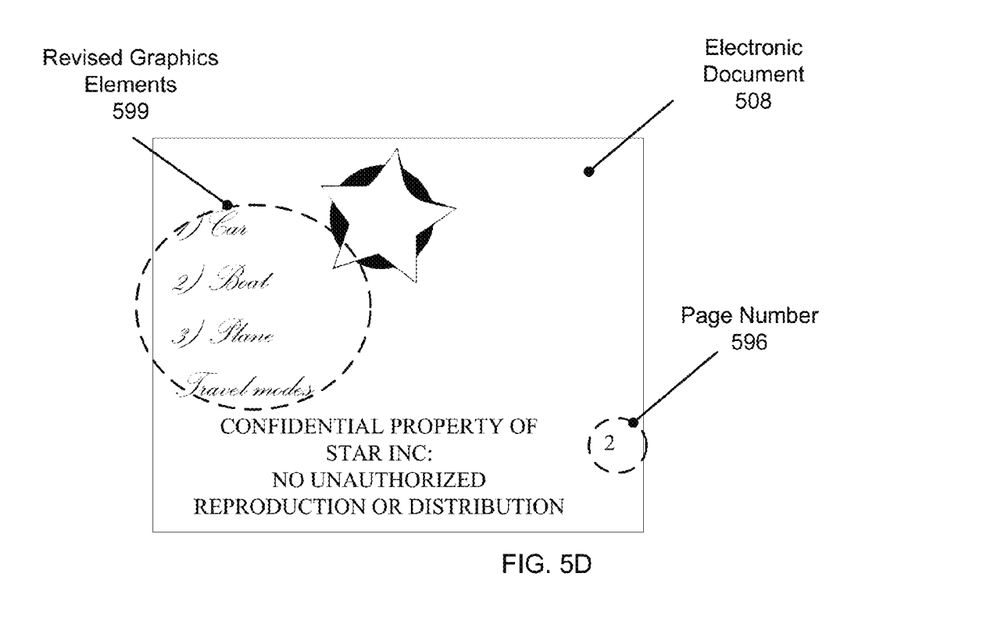

FIG. 5D shows the electronic document (508) generated based on the image (502). As shown in FIG. 5D, the electronic document (508) includes a revised version of the non-command graphics elements (599). The revised versions are the text characters extracted from performing ICR on the graphics elements in the image (502). As also shown in FIG. 5D, applying the star configuration file to the electronic document (508) includes inserting the logo specified in the star configuration file (510) into the electronic document (508), inserting the confidentiality statement specified in the star configuration file (510) into the electronic document (508), and setting the font of the revised version of the non-command graphics elements (599) to the font specified in the star configuration file (510). Like the example in FIG. 4D, the page number (596) has been calculated and inserted into the electronic document (508).

Figure 6A:
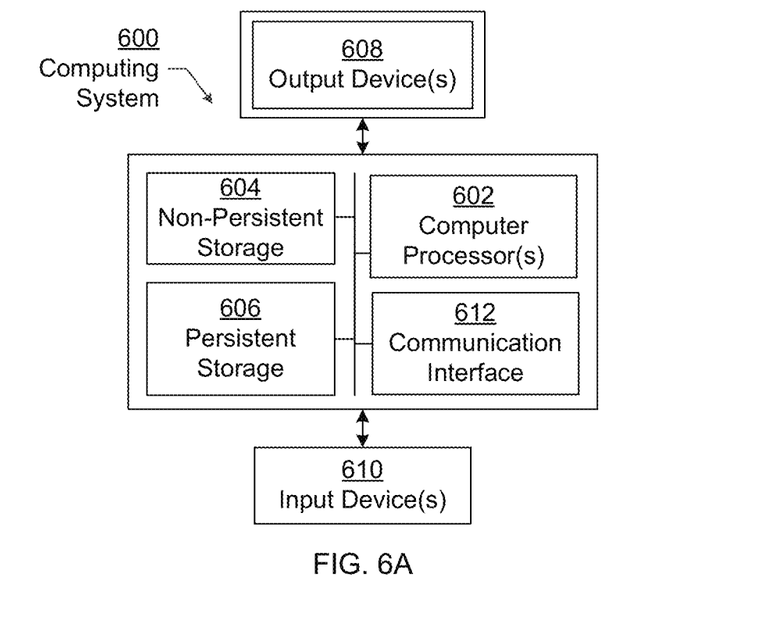
FIG. 6A and FIG. 6B show computing systems in accordance with one or more embodiments of the invention.

Embodiments of the invention, including the buffer (102), the command engine (106), the document synthesizer (116), the repository (108), may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 6B:
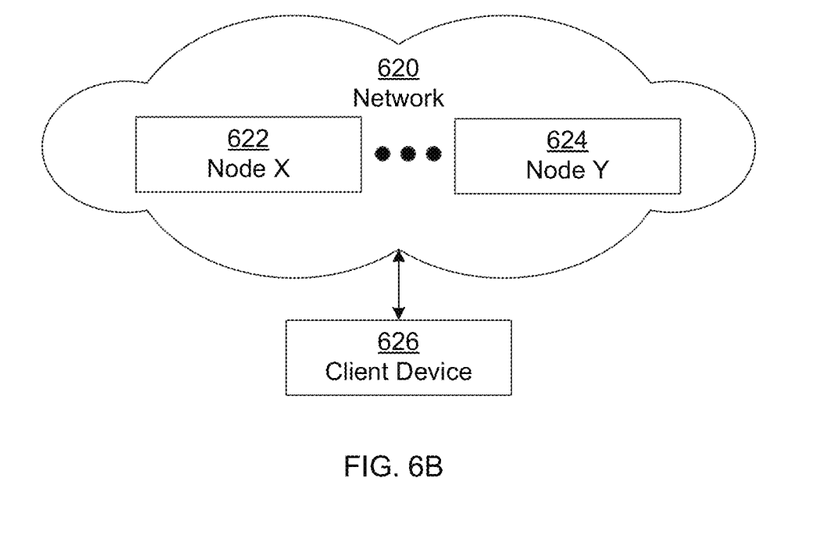

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The above description of functions present only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
    obtaining an image comprising:
        a first graphics element comprising a first hand-drawn character; and
        a second graphics element comprising a second hand-drawn character;
    determining that the first graphics element is a command specifying a name of a font and that the second graphics element is a non-command; and
    generating an electronic document comprising a text character corresponding to the second hand-drawn character and in the font,
    wherein the electronic document does not include the first graphics element.

2. The method of claim 1, wherein determining that the first graphics element is the command comprises:
    extracting a plurality of characters from the first graphics element by executing intelligent character recognition (ICR) on the image, wherein the first graphics element is a hand-written string;
    identifying a command-invoking character within the plurality of characters; and
    mapping a subset of the plurality of characters to the command.

3. The method of claim 1, further comprising:
    identifying a third graphics element in the image, wherein the third graphics element corresponds to a command to insert a logo into the electronic document; and
    retrieving the logo from a repository external to the image in response to identifying the third graphics element,
    wherein the image does not include the logo, and
    wherein the electronic document comprises the logo.

4. The method of claim 1, further comprising:
    identifying a third graphics element in the image, wherein the third graphics element corresponds to a command to calculate a plurality of page numbers for the electronic document; and
    calculating the plurality of page numbers for the electronic document in response to identifying the third graphics element,
    wherein the electronic document comprises the plurality of page numbers.

5. The method of claim 1, further comprising:
    identifying a third graphics element in the image, wherein the third graphics element corresponds to a command to insert a text string into the electronic document; and
    retrieving the text string from a repository external to the image in response to identifying the third graphics element,
    wherein the electronic document comprises the text string, wherein the text string exists before the image is obtained, and wherein the image does not include the text string.

6. The method of claim 1, further comprising:
identifying a third graphics element in the image, wherein the third graphics element corresponds to a command associated with a document setting selected from a group consisting of a margin of the electronic document, a page size of the electronic document, and a background color of the electronic document; and
modifying the electronic document based on the document setting.

7. The method of claim 1, wherein the command identifies a configuration file specifying a plurality of document settings including the font, and wherein the plurality of document settings in the configuration file is applied to the electronic document.

8. The method of claim 1, wherein the first graphics element is hand-drawn in the image on a writing board.

9. A system for image processing, comprising:
a memory storing an image comprising:
a first graphics element comprising a first hand-drawn character; and
a second graphics element comprising a second hand-drawn character; and
a processor connected to the memory that:
determines that the first graphics element is a command specifying a name of a font and that the second graphics element is a non-command; and
generates an electronic document comprising a text character corresponding to the second hand-drawn character and in the font,
wherein the electronic document does not include the first graphics element.

10. The system of claim 9, wherein the command engine also:
extracts a plurality of characters from the first graphics element by executing ICR on the image,
wherein the first graphics element is a hand-written string on a writing board;
identifies a command-invoking character within the plurality of characters; and
maps a subset of the plurality of characters to the command.

11. The system of claim 9, wherein the processor also:
identifies a third graphics element in the image, wherein the third graphics element corresponds to a command to insert a logo into the electronic document; and
retrieves the logo from a repository external to the image in response to identifying the third graphics element,
wherein the image does not include the logo, and
wherein the electronic document comprises the logo.

12. The system of claim 9, wherein the processor also:
identifies a third graphics element in the image, wherein the third graphics element corresponds to a command to calculate a plurality of page numbers for the electronic document; and
calculates plurality of page numbers for the electronic document in response to identifying the third graphics elements, and
wherein the electronic document comprises the plurality of page numbers.

13. The system of claim 9, wherein the processor also:
identifies a third graphics element in the image, wherein the third graphics element corresponds to a command to insert a text string into the electronic document; and retrieves the text string from a repository in response to identifying the third graphics element,
wherein the electronic document comprises the text string, and
wherein the image does not include the text string.

14. The system of claim 9, further comprising a repository storing a configuration file specifying a plurality of document settings including the font, wherein the plurality of document settings in the configuration file is applied to the electronic document.

15. A non-transitory computer readable medium storing computer readable program code embodied therein that:
obtains an image comprising:
a first graphics element comprising a first hand-drawn character; and
a second graphics element comprising a second hand-drawn character;
determines that the first graphics element is a command specifying a name of a font and that the second graphics element is a non-command; and
generates an electronic document comprising a text character corresponding to the second hand-drawn character and in the font,
wherein the electronic document does not include the first graphics element.

16. The non-transitory computer readable medium of claim 15, wherein determining that the first graphics element corresponds to the command comprises:
extracting a plurality of characters from the first graphics element by executing ICR on the image,
wherein the first graphics element is a hand-written string on a writing board;
identifying a command-invoking character within the plurality of characters; and
mapping a subset of the plurality of characters to the command.

17. The non-transitory computer readable medium of claim 15, wherein the computer readable program code also:
identifies a third graphics element in the image, wherein the third graphics element corresponds to a command to insert a logo into the electronic document; and
retrieves the logo from a repository external to the image in response to identifying the third graphics element,
wherein the image does not include the logo, and
wherein the electronic document comprises the logo.

18. The non-transitory computer readable medium of claim 15, wherein the computer readable program code also:
identifies a third graphics element in the image, wherein the third graphics element corresponds to a command to calculate a plurality of page numbers for the electronic document; and
calculates a plurality of page numbers for the electronic document in response to identifying the third graphics element,
wherein the electronic document comprises the plurality of page numbers.

19. The non-transitory computer readable medium of claim 15, wherein the computer readable program code also:
identifies a third graphics element in the image, wherein the third graphics element corresponds to a command to insert a text string into the electronic document; and
retrieves the text string from a repository in response to identifying the third graphics element,
wherein the image does not include the text string, and
wherein the electronic document comprises the text string.

20. The non-transitory computer readable medium of claim 15, wherein the command identifies a configuration file specifying a plurality of document settings including the font, and wherein the plurality of document settings in the configuration file is applied to the electronic document.

\* \* \* \* \*